(12) United States Patent
Brandriff et al.

(10) Patent No.: US 10,510,256 B2
(45) Date of Patent: *Dec. 17, 2019

(54) VEHICLE COLLISION AVOIDANCE SYSTEM AND METHOD

(71) Applicants: Robert Brandriff, Brooklyn, CT (US); Kristen Brandriff, Brooklyn, CT (US)

(72) Inventors: Robert Brandriff, Brooklyn, CT (US); Kristen Brandriff, Brooklyn, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,057

(22) Filed: Jun. 26, 2018

(65) Prior Publication Data

US 2019/0012919 A1    Jan. 10, 2019

Related U.S. Application Data

(63) Continuation-in-part of application No. 14/918,427, filed on Oct. 20, 2015, now Pat. No. 10,008,118.

(Continued)

(51) Int. Cl.
*B60Q 1/00* (2006.01)
*G08G 1/16* (2006.01)
(Continued)

(52) U.S. Cl.
CPC .......... *G08G 1/166* (2013.01); *B60W 30/165* (2013.01); *G08G 1/163* (2013.01); *G08G 1/167* (2013.01); *B60K 35/00* (2013.01); *B60K 2370/179* (2019.05); *B60K 2370/188* (2019.05); *B60K 2370/193* (2019.05); *B60R 1/00* (2013.01);
(Continued)

(58) Field of Classification Search
CPC ........ G08G 1/166; G08G 1/163; G08G 1/167; B60K 35/00; B60K 2350/1084; B60K 2350/2008; B60K 2350/965; B60R 1/00; B60R 2300/202; B60R 2300/806; G01P 11/02
See application file for complete search history.

(56) References Cited

U.S. PATENT DOCUMENTS

3,689,882 A    9/1972 Dessailly
4,028,662 A    6/1977 Young
(Continued)

*Primary Examiner* — Hai Phan
*Assistant Examiner* — Anthony D Afrifa-Kyei
(74) *Attorney, Agent, or Firm* — Andrew C. Aitken (57) ABSTRACT

A vehicle control system is disclosed that includes a forward-facing signal sensor operable to detect transmitted data signals reflecting a presence, relative distance and relative location of a first forward obstruction in front of a vehicle, an on-board vehicle status sensor configured to generate a status signal reflecting the speed of the vehicle, a processor to receive the transmitted data signals the forward obstruction and (2) the status sensor signals and (3) a relay signal receiver adapted to receive a signal from the forward obstruction and originating from a source remote from the forward obstruction, and a signal transmitter adapted to transmit information to a following vehicle, wherein the information includes the status signal and information from said forward facing signal sensor and the relay signal and the processor creates a vehicle control signal in response to a collision avoidance algorithm run by the processor that uses data from said forward facing signal detectors, the status signal and the relay signal in the event that said algorithm determines that a collision is imminent.

13 Claims, 8 Drawing Sheets

Related U.S. Application Data (60) Provisional application No. 62/066,241, filed on Oct. 20, 2014.

(51) Int. Cl.
    *B60W 30/165*     (2012.01)
    *B60K 35/00*     (2006.01)
    *B60R 1/00*     (2006.01)
    *G01P 11/02*     (2006.01)

(52) U.S. Cl.
    CPC . *B60R 2300/202* (2013.01); *B60R 2300/8066* (2013.01); *B60W 2420/52* (2013.01); *G01P 11/02* (2013.01)

(56) References Cited

U.S. PATENT DOCUMENTS

| | | |
|---|---|---|
| 4,168,499 A | 9/1979 | Matsumura |
| 4,349,823 A | 9/1982 | Tagami |
| 4,543,577 A | 9/1985 | Tachibana |
| 4,552,456 A | 11/1985 | Endo |
| 4,626,850 A | 12/1986 | Chey |
| 4,757,450 A | 7/1988 | Etoh |
| 4,833,469 A | 5/1989 | David |
| 5,128,669 A | 7/1992 | Dadds et al. |
| 5,162,997 A | 11/1992 | Takahashi |
| 5,189,619 A | 2/1993 | Adachi et al. |
| 5,285,523 A | 2/1994 | Takahashi |
| 5,473,538 A | 12/1995 | Fujita et al. |
| 5,506,584 A | 4/1996 | Boles |
| 5,541,590 A | 7/1996 | Nishio |
| 5,600,561 A | 2/1997 | Okamura |
| 5,646,612 A | 7/1997 | Byon |
| 5,668,880 A | 9/1997 | Alajajiarl |
| 6,313,758 B1 * | 11/2001 | Kobayashi ............. G08G 1/162 340/436 |
| 6,359,552 B1 * | 3/2002 | King ...................... G08G 1/161 180/167 |
| 7,912,645 B2 | 3/2011 | Breed et al. |
| 7,990,283 B2 | 8/2011 | Breed |
| 8,255,144 B2 | 8/2012 | Breed et al. |
| 8,629,789 B2 | 1/2014 | Hoffberg |
| 10,008,118 B2 * | 6/2018 | Brandriff ............... G08G 1/163 |
| 2007/0100537 A1 * | 5/2007 | Parikh ................... G08G 1/127 701/117 |
| 2007/0106431 A1 * | 5/2007 | Tsuzuki ................ G08G 1/161 701/1 |
| 2009/0074249 A1 * | 3/2009 | Moed ................ G06K 9/00818 382/104 |
| 2012/0283894 A1 * | 11/2012 | Naboulsi ............ B60R 11/0264 701/1 |
| 2016/0264047 A1 * | 9/2016 | Patel .................. G06K 9/00805 |

* cited by examiner

VEHICLE COLLISION AVOIDANCE SYSTEM AND METHOD

The inventors claim the benefit of the filing date of U.S. Application No. 62/066,241 filed Oct. 20, 2014 and U.S. application Ser. No. 14/918,427 filed Oct. 20, 2015. The present invention is directed to a vehicle collision warning system, and more particularly a warning and collision avoidance system that includes vehicle to vehicle communications.

BACKGROUND OF THE INVENTION

With the increase in automobile usage in the 1940's and early 1950's, studies were under taken by auto manufacturers and civil engineering educators related to the response of vehicles and operators along with the design of roadways to handle the increasing demand. These methods remain in use today and have come to be referred to as Car Following (CF) studies with the interaction of vehicle density, vehicle performance, roadway design and construction, and operator interaction reduced to mathematical equations. Argument continues within the science as to the parameters of importance in the mathematical models and the accuracy of the calculated results, but it is general accepted that the points of significance include: vehicle speed, maximum vehicle acceleration and deceleration, distance (headway) between vehicles, operator reaction time, and vehicle density. Numerous equations have been developed as a product of this research with calculations intended to demonstrate roadway capacity (vehicles/hour), roadway congestion (cars/mile), vehicle speed as a function of traffic density, the demarcation between stable and unstable conditions, and to predict the time to collision (TTC) under varying conditions. A key conclusion from these studies was that an operator's lack of awareness of events unfolding several vehicles downstream often resulted in the propagation of a perturbation into the upstream traffic flow with ever increasing intensity. The result of this effect was often observed as a slowing of traffic in a phantom traffic jam and not uncommonly resulting in an actual rear-end collision. The present invention addresses this significant CF circumstance by providing vehicle operators with the status of conditions downstream in real time. While the equations and calculations shown in prior studies remain applicable, the conditions available from application of the invention simplify the analysis to approximate that of only a single vehicle unit following a lead vehicle since all following vehicles have instant, real time information as to conditions and all can, therefore, act simultaneously and independently adjust to changing conditions as needed.

There has been considerable interest and development efforts in connection with the computer assisted detection, distance measuring, and vision system that relate to automobile warning systems that can alert drivers or provide commands to autonomous vehicles relevant to developing or changing conditions ahead of their respective vehicle. The insurance industry, government agencies, automobile manufactures along with other safety minded groups, have recognized the need for vehicles to employ collision warning and/or avoidance systems.

For example, a method developed by Suburu and called "EyeSight" is directed to a system that monitors traffic conditions ahead of the vehicle and provides alerts to the driver. It also assumes some level of control over the operation of the vehicle. There are also disclosures in the prior art that include fairly complicated traffic monitoring and control concepts that send information regarding traffic conditions into the traffic stream through permanently positioned WiFi and other types of signal transmitters located along the sides of highways.

Common occurrences in moderate to heavy city and highway traffic are congestive chain-reaction slow-downs and related chain-reaction collisions. In some cases the occurrence is triggered by a specific event such as road construction, a mechanical breakdown, or an accident, but very often there is no definite or specific cause for the occurrence other than an ever increasing braking action as drivers sequentially react to an unknown non-specific change in conditions immediately in front of them.

It is believed that a driver's sudden braking reaction propagates up-stream from a vehicle to the following vehicle with a predictable increase in magnitude. It has also been shown that the chain-reaction effect may be disrupted when an attentive driver monitors conditions several vehicles ahead and is therefore able to anticipate the need for a gradual change such as speed reduction without excessive brake application.

The object of the invention is to provide drivers with a vehicular system that monitors conditions in front of their vehicle to facilitate a controlled reaction to changing conditions, and to also provide information up-stream to following vehicles to further promote the continued propagation of the controlled reaction. It is a further object to provide input commands to autonomous vehicles in response to the detection of roadway conditions that reflect a collision vector.

Vehicles have been equipped with brake-lights on the rear of vehicles to provide an alert to the driver of a following vehicle for many years. Through the intervening years, brake-light technology has improved and those advancements included an increase in number, illumination intensity, size and location to provide to following drivers a highly noticeable signal. However, signals from conventional brake lights are a limited-information binary alert that warns of a possible change in vehicle speed but provide no other definitive information.

Some years after the introduction of the brake-light, turn-signal lights were added for the purpose of providing additional information to other drivers that change in speed and/or direction were imminent. While providing more information than the brake-light, this again provided a limited alert requiring and dependent upon additional observation and interpretation on the part of the following driver.

More recent technology includes a variety of radar based proximity systems, brake light detection and image processing systems to assist with providing information to help with collision avoidance. The following other U.S. patents or publications are all generally directed to different collision avoidance systems.

U.S. Pat. No. 8,629,789 is directed to a mobile communication device and discloses a system that collects multiple data points including radio tower transmission and satellite data, the location of a vehicle as well as laser detection systems. It also detects brake lights. The system contemplates providing data relating to potholes and traffic jams, such as those caused by accidents, icing, rain, and sun glare. The system tracks abnormal traffic patterns by comparing a vehicle speed to the speed limit of historical average speed.

U.S. Pat. No. 5,668,880, relates to an inter vehicle data communication device. The '880 Patent teaches systems which integrate GPS, GLONASS, LORAN or other positioning systems into vehicular guidance systems and generally disclose use of radar, laser, acoustic and visual sensors have all been applied to vehicular guidance and control.

U.S. Pat. No. 5,541,590 relates to a vehicle crash predictive and evasive system, employing image data and neural networks.

U.S. Pat. No. 5,646,612 relates to a vehicle collision avoidance system, using an infrared imaging system including an infrared camera.

U.S. Pat. No. 5,285,523 relates to a neural network system for recognizing driving conditions and controlling the vehicle in dependence thereon.

U.S. Pat. No. 5,189,619 relates to an artificial intelligence based adaptive vehicle control system. It discloses a laser radar apparatus.

U.S. Pat. No. 5,162,997 relates to a driver-adaptive automobile control system that focuses on predicting particular driver characteristics.

U.S. Pat. No. 3,689,882 relates to an anti-collision radar system for detecting obstacles or on-coming vehicles. It teaches taking into account all traffic conditions. It includes automatic braking systems. The system uses a radar detector and determines the safe distances between vehicles.

U.S. Pat. No. 5,506,584 relates to a system for communication between vehicles through a transmitter and transponder relationship. The patent refers to a system that can handle as many as 90 vehicles within one half mile of a fixed interrogation device in a multi-lane environment, where many of them may be at the same or nearly the same range. The '584 patent discloses a transponder device, coded responses which are randomized in time, and an interrogation device which processes the return signals to provide vehicle identification, speed, location and transponder status information on vehicles to an operator or for storage in memory.

U.S. Pat. No. 5,128,669 provides for two-way communication and addressing messages to specific vehicles.

U.S. Pat. No. 7,990,283 discloses an accident avoidance system using an infrastructure system to convey location information between vehicles including at least two vehicles approaching or traveling on a roadway and each having onboard, a position determining system that receives satellite positioning signals from a plurality of satellites and determines location information based on the satellite positioning signals, a transmitter that transmits the location information for the vehicle to an infrastructure system, a receiver that receives location information for another vehicle from the infrastructure system, and an accident risk warning system that alerts its operator of a risk of an accident based on the location information for any other vehicles and map data representing the roadway including edges or lane boundaries of the roadway.

U.S. Pat. No. 8,255,144 assigned to Intelligent Technologies International, Inc., Denville, N.J. discloses a system and method for conveying data between vehicles includes a data generating system arranged on a first vehicle to obtain or generate information about the first vehicle or conditions around the first vehicle, a first communications system arranged on the first vehicle and coupled to the data generating system for communicating with a wireless Internet service provider (ISP) and a second communications system arranged on a second vehicle and communicating with an ISP. The first communications system enables the information obtained or generated by the data generating system to be transmitted via the Internet to the second communications system. The first and second communications systems can communicate with the same ISP or different ISPs linked to one another.

U.S. Pat. No. 7,912,645 discloses an arrangement and method for displaying and transferring information between a vehicle and at least one transmitter separate from the vehicle includes an antenna mounted on the vehicle for receiving RF wireless signals emitted by each transmitter, a location determining device for determining the vehicle's location, a display arranged on the vehicle in a position to be viewable by a vehicle occupant and to display representations of the vehicle and other objects in the vicinity of the vehicle, and a processor coupled to the antenna, location determining device and display. The transmitter is located at a fixed position. The processor performs location-based filtering of signals received by the antenna to determine whether any contain information of interest for vehicular operation, extracts the information of interest from the signals determined to contain information of interest, and displays the location of the transmitter of the signals determined to contain information of interest or the information of interest from the transmitter.

U.S. Pat. No. 4,757,450 relates to a reflected beam system for detecting a preceding vehicle that is used to allow control over inter-vehicular spacing.

U.S. Pat. No. 4,833,469 relates to an obstacle proximity sensor, employing, inter alia radar beam to determine distance and relative velocity of an obstacle for collision avoidance.

U.S. Pat. No. 5,600,561 relates to a vehicle distance data processor which computes a velocity vector based on serial timepoints. This reference discloses capturing multiple vehicles data ahead of the subject.

U.S. Pat. No. 4,552,456 relates to optical pulse radar for an automobile.

U.S. Pat. No. 4,543,577 relates to a moving obstacle detection system for a vehicle, using Doppler radar.

U.S. Pat. No. 4,349,823 relates to an automotive radar system for monitoring objects in front of the vehicle.

U.S. Pat. No. 5,473,538 relates to a collision judging system for a vehicle, triggered by a braking event and determining a distance to an obstacle in front of the vehicle.

U.S. Pat. No. 4,168,499 relates to an anti-collision radar system.

U.S. Pat. No. 4,626,850 relates to a vehicle detection and collision avoidance apparatus, using an acoustic sensor U.S. Pat. No. 4,028,662 relates to a passing vehicle signaling apparatus, to detect adjacent vehicles during a lane change.

BRIEF DESCRIPTION OF THE INVENTION

The present invention is directed to a system and method that uses established sensor and detection technology as discussed above. Information regarding the location and operation of a vehicle is continuously collected using conventional sensors including any or all GPS, speedometers, accelerometers, braking data from the braking system, optical sensors, and radar. In embodiments the radar is a tracking radar. The collected data is captured, associated with the time of collection, and analyzed.

Central to the present invention is the communication of data between proximate vehicles wherein data gathered from in front of a first vehicle "A" are detected, processed, combined with condition data of vehicle "A", and then transmitted to a second vehicle "B" following the first vehicle "A" so that vehicle "B" has essentially the view of conditions to and through vehicle "A." This concept described herein is distinguished from systems disclosed above because, inter alai such technology contemplates that each vehicle as a singular unit rather than as part of a continuous data-stream system as described herein.

In the system and method of the invention, information is gathered, analyzed, modified, and transmitted upstream from vehicle to vehicle in a theoretically endless flow that could extend for many highway miles, limited, and attenuated as needed by the system software algorithm so that only essential, relevant, and meaningful signals are either displayed in any one vehicle or used to assist with the control of an autonomous vehicle. An analogy is that of the existing brake and turn-signal lights on the back of a car that are positioned to transmit non-specific binary information to alert the following car of possible impending changes. Using existing technology, the information transmitted upstream can be much more extensive so that analysis by the on-board system will give the operator or driving system a more complete understanding of pending conditions for a logically significant distance/time in front of the subject vehicle.

Like embodiments of the present system, most of the systems described in the prior art contemplate that the driver of the vehicle is still responsible for the control of the vehicle. As such, the balance between the system capability and the driver attention and skill that is required need to be clear and easily understandable. Embodiments of present invention provides a driver with a "vision" and alert of impending conditions so that the driver has data available to make an informed decision. This alert can be communicated by both visual and audio signals and the signal volume and intensity can be adjusted to correspond to the relative severity of the impending circumstance.

In alternative embodiments the output from the algorithm is used in connection with the control of an autonomous vehicle.

The present invention includes a system wherein a plurality of information relating to first vehicle, including, the first vehicle speed, direction vector, acceleration or deceleration and geographic location is collected and analyzed. This information is then transmitted upstream to a second vehicle wherein a similar plurality of information is also collected relating to the second vehicle. The information from the first and second vehicles is then processed by the second vehicle system and, according to a predetermined algorithm, a signal is generated and transmitted to the third vehicle.

Thus, according to the invention, the second vehicle then transmits a signal rearward to a third vehicle which comprises the analyzed data relating to its speed, acceleration, deceleration, direction, and location and including the analyzed information received from the first vehicle. In a similar manner the combined signal transmitted to the third vehicle is then analyzed by the third vehicle system to provide a collision alert, warning or control signal to an autonomous vehicle as needed. This daisy chain propagation of information upstream will then continue with the system algorithm of each vehicle truncating the received information relative to the realistic reaction response of that vehicle.

The system described is therefore directed to an early warning traffic condition monitor and collision avoidance system that includes a wireless communication system (which may comprise infrared or radio) that is useful when three vehicles traveling in the same direction in a lane and wherein the lead vehicle transmits a series of signals to the middle vehicle wherein the signal includes information relating to its speed, direction, and acceleration/deceleration and the middle vehicle sends to the third vehicle a signal that includes analyzed information from the first vehicle and information relating to the middle vehicle.

The data is collected from a variety of sensors which may include radar, GPS, on board speedometers, accelerometers, photo detectors, and other image sensors and correlated with a particular vehicle. The signal from each equipped vehicle is transmitted to trailing vehicles using infrared or using other wireless technologies.

DETAILED DESCRIPTION OF THE INVENTION

Figure 1:
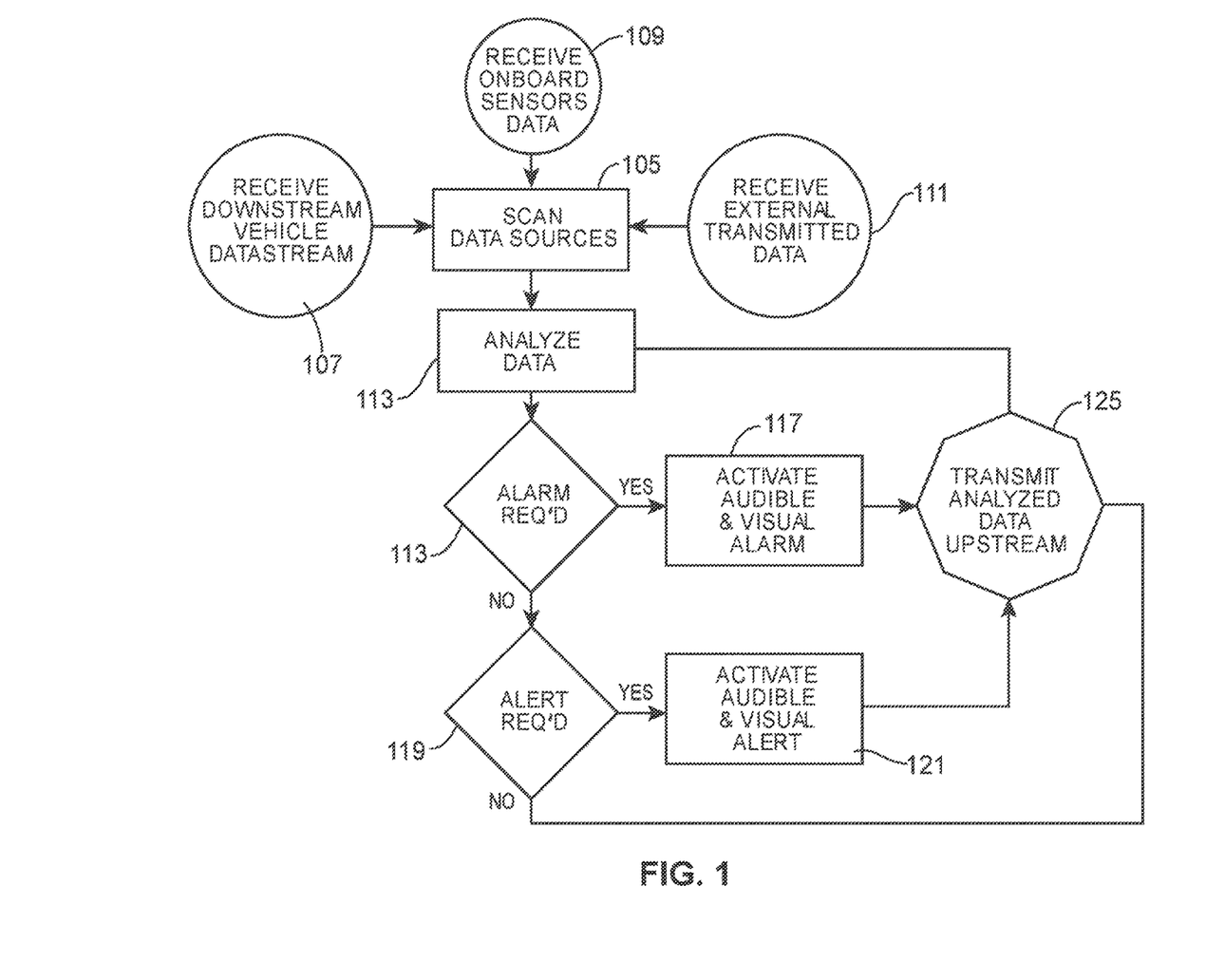
FIG. 1 is a flow chart depicting the flow of data in an embodiment the invention.

Referring now to FIG. 1, an embodiment of the invention is implemented on a system that comprises monitoring and control technology as described above including signal reception from a downstream vehicle, and reception of external transmitted data from GPS, radar, and vision or optical sensors.

Now referring to FIG. 1, the signal processing flow is illustrated. An vehicle includes a central processor that continuously scans data at step 105 that includes data from downstream vehicle 107, on board sensors 109 and external transmitted data such as from GPS systems. This data is analyzed in step 113 and, at step 115 if the algorithm dictates that an alarm is required, the sequence proceeds to step 117 which triggers both an audio and visual alarm. If no alarm is triggered, the algorithm proceeds to step 119 to determine if conditions dictate that an alert is triggered at step 121. If an alert is issued, an audible and visual signal is initiated. The alert audible and visual signal is different than the audible and visual signal from the alarm step. If neither an alert nor an alarm is activated the system proceeds to step 125. The system according to the invention may further include onboard sensors to collect and monitor vehicle operation that may including accelerometers, speedometers, and a sensor to detect the implementation of the brake system, turn signals and other operator-controlled actions. In an embodiment, the system is provided data from the windshield wiper operating, including the selected speed of the wipers and analyzes the data in the algorithm. In addition, the system includes a signal transmitter and signal receiver and processor. The data from the various sensors and from received signals is collected and processed according to the algorithms disclosed herein. As discussed below, output from the processor includes signal to an alert display, an audio signal as well as information for a signal to be transmitted from a transmitter for use in other vehicles.

Figure 2:
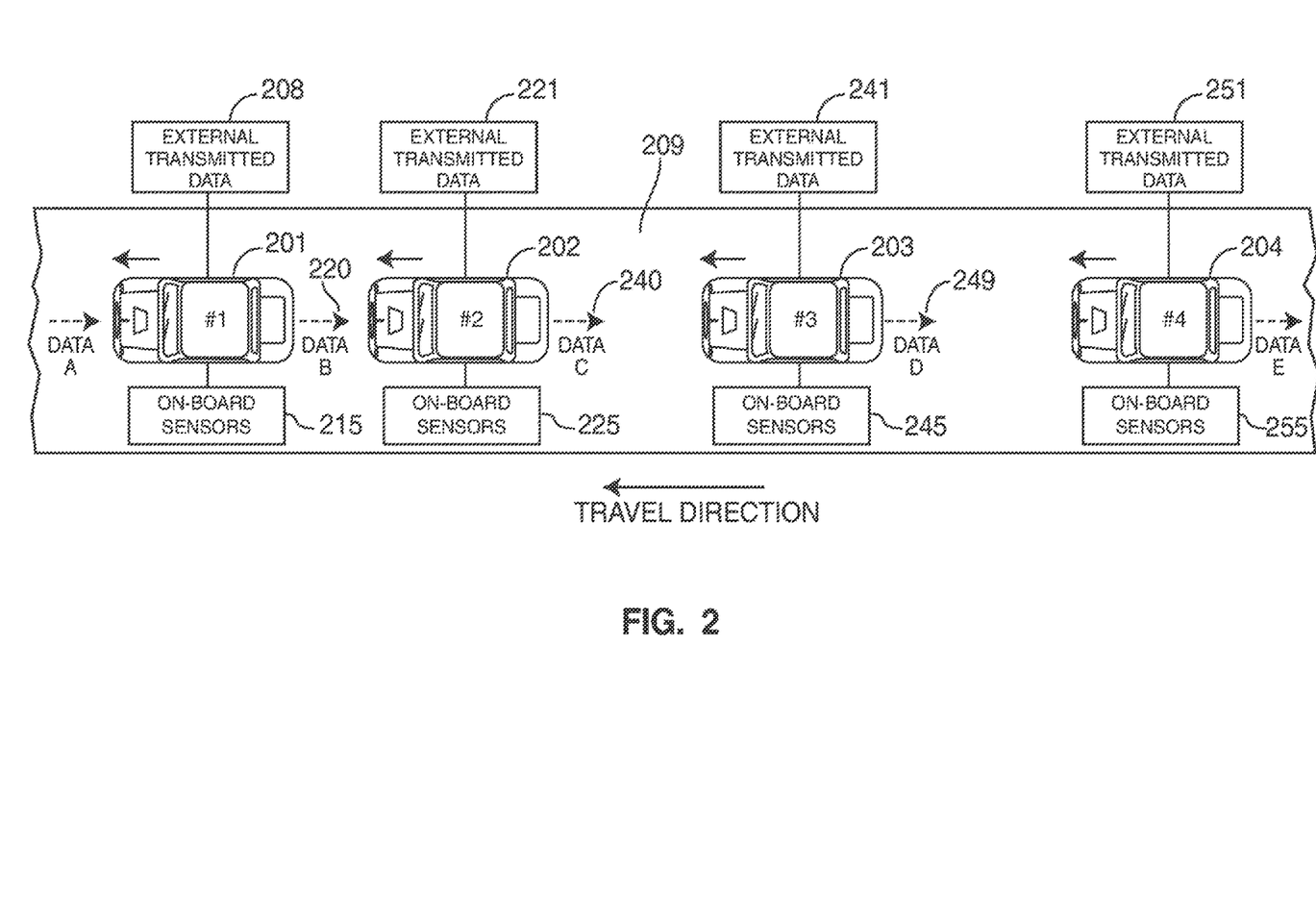
FIG. 2 is a schematic representation of the vehicle to vehicle data flow according to embodiments of the invention.

Now referring to FIG. 2, according to an embodiment of the invention, a plurality of vehicles 201, 202, 203 and 204 in a travel lane 209 receive and process data to inform each driver of travel conditions ahead. As shown in FIG. 2, vehicle 201 has an open road in front so no data is received from a downstream vehicle. External transmitted data 208 is received, however, and combined and analyzed with onboard sensor 215 data to establish the operating status of vehicle No. 1. The status is then displayed for the vehicle operator and transmitted upstream to vehicle 202. Vehicle 202 in turn, analyzes the received data B 220 from vehicle 201, external transmitted data 221 and data from onboard sensors 225, and establishes a status of vehicle 202. As with vehicle 201, the status is displayed for the vehicle operator including any alarms or alerts the system has calculated, and this data C status 240 is transmitted upstream to vehicle 203. Vehicle 203 uses data C 240, external transmitted data process repeats for each following vehicle, in turn, with the system algorithm truncating forward data not relevant to the particular vehicle. Vehicle 204 receives data D 249 which includes relevant data from data B 220 and data C 240. Vehicle 204 analyzes data D along with external transmitted data 251 and data from on board sensors 255 to provide an output signal. In embodiments, the system may only use upstream transmitted data and the on-board sensors in the analysis to provide either an alarm, alert, or status quo signal.

The system includes signal technology for the transmission of information up-stream to the next following vehicle. As an example, starting with vehicle 201 (first in an arbitrary line), the information imbedded in the data stream transmitted from vehicle 201 to the following vehicle 202 is weighted by a suitable separation distance/speed algorithm between vehicle 201 and vehicle 202, and the transmitted condition of vehicle 201 (as examples: Displayed in vehicle 202 for the status of vehicle 201 as visual and audible signals; green—"Okay"; amber+audible beep—"Alert"; or red+audible alarm—"Alarm"). This information is then processed to generate the appropriate control reaction within vehicle 202, and the modified data relayed to the next following vehicle 203 with the circumstance indicated on the vehicle 203 graphic/audible display denoting vehicles 201 and 202 with their corresponding conditions.

Again, the algorithm for vehicle 203 considers the separation distance and speed data of vehicle 201 and vehicle 202, the separation distance and speed from vehicle 202 to vehicle 203, etc. Through this process the forward look from forward vehicle 201 is transmitted to vehicle 202, the forward look from vehicle 202 (including the data from vehicle 201) is transmitted to vehicle 203. By providing information with respect to vehicles 201 and 202 to vehicle 203, the analyzed information can serve to mitigate or eliminate the chain-reaction propagation phenomena at the earliest possible point and the continuation of that abatement up-stream to subsequent following vehicles. The transmission of data can then continue up the traffic stream limited only by the design of the system and display, and the processing limits established in the software algorithms.

In an example, the system algorithm will truncate data from vehicles outside of the response zone of a specific vehicle in order minimize the quantity of displayed information and to make the displayed information most relevant. A vehicle traveling at 30 MPH on light traffic would not need to display information from a downstream vehicle more than a mile ahead. In heavy or congested traffic, it would be of greater importance to monitor vehicles in that same distance since the ripple effect of any sudden change would propagate quickly through the traffic stream.

As discussed above, embodiments of the invention include a handshake feature wherein vehicles in proximity will receive signals and confirm reception.

The handshake feature enables drivers and the system to both confirm the existence of the communication system and be provided with an alert if a communication system in an adjacent vehicle is not responding to the data transmission so that vehicle can be identified and possibly alerted via an alternative means.

The signal from the vehicles is transmitted using one or more of a variety of conventional signal technologies including radio waves, such as 300 Hz technology, infrared, WiFi, Wimax, or even visual.

Figure 3:
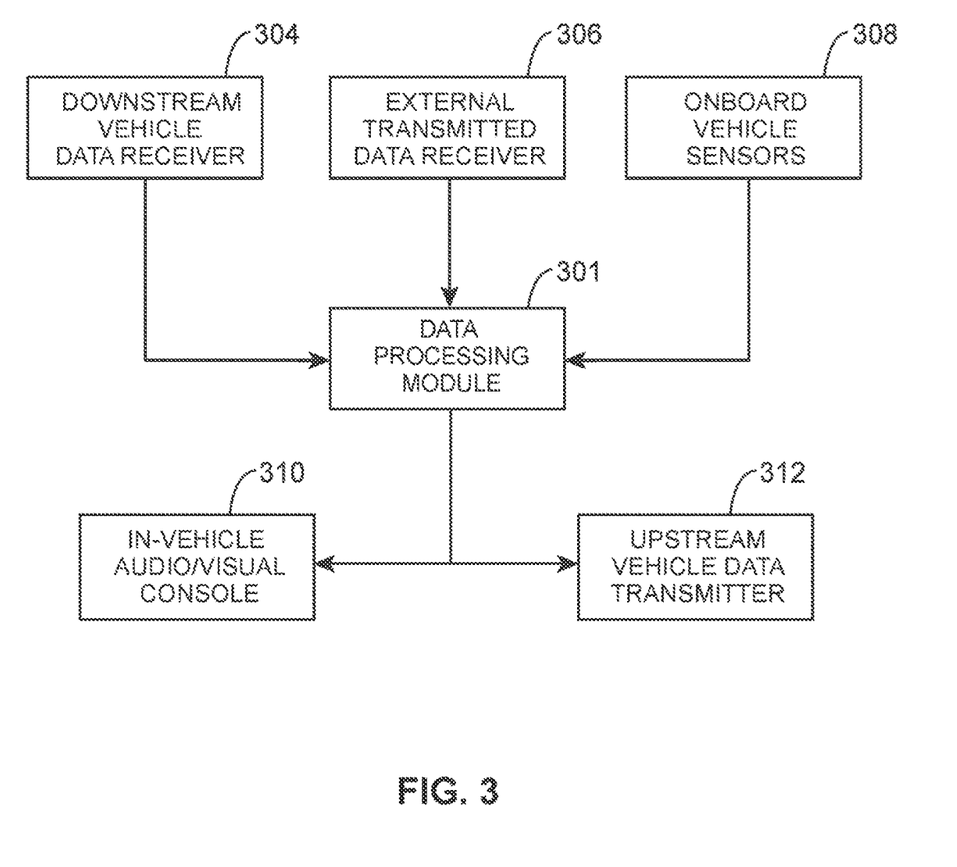
FIG. 3 is a schematic representation of the components that are used in embodiments of the invention.

Now referring to FIG. 3, a schematic representation of the system according to an embodiment of the invention used on a particular vehicle is shown that includes a data processing module 301, a downstream data receiver 304, an external transmitted data received 306 (Such as a GPS system), onboard vehicle sensors 308 and console 310 that includes audio speakers and visual display and console 301 and an upstream vehicle data transmitter 312.

FIGS. 4a-4d depict aspects of a display and driver communication system according to an embodiment of the invention. The display a map element 405 and a proximate vehicle display 404. Proximate vehicle display 404 can display dynamic information relating to current driving conditions and display a series of indicator lights that reflect the presence of relevant vehicles on the road and travelling in the same direction of travel. These indicator lights, such as light 409 on display 404, are displayed at locations to simulate the distance between the relative vehicles that are represented on the display and their location will change as the system is continuously updated with new data. As such the location of the depictions vary in FIGS. 4a, 4b, 4c and 4d. While the depiction in FIGS. 4a-4d shows a single travel lane, it is contemplated that the system could include data from vehicles in adjacent traffic lanes that include vehicles that are traveling in the same direction, or in other directions. The display may use a led display or be a series of LEDs that can be selectively illuminated.

Figure 4A:
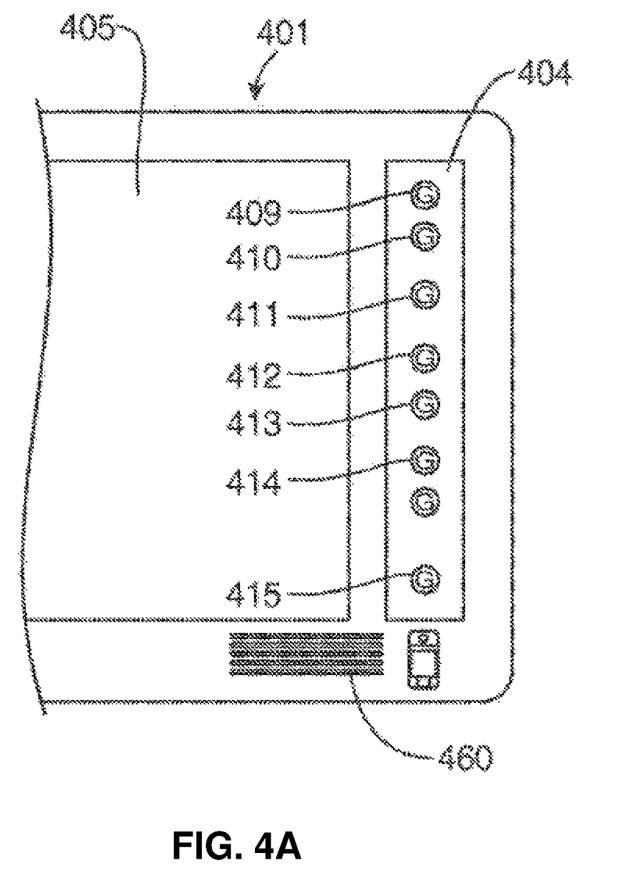
FIG. 4a is system display schematic when the system is in heavy traffic flow according to an embodiment of the invention.
Figure 4B:
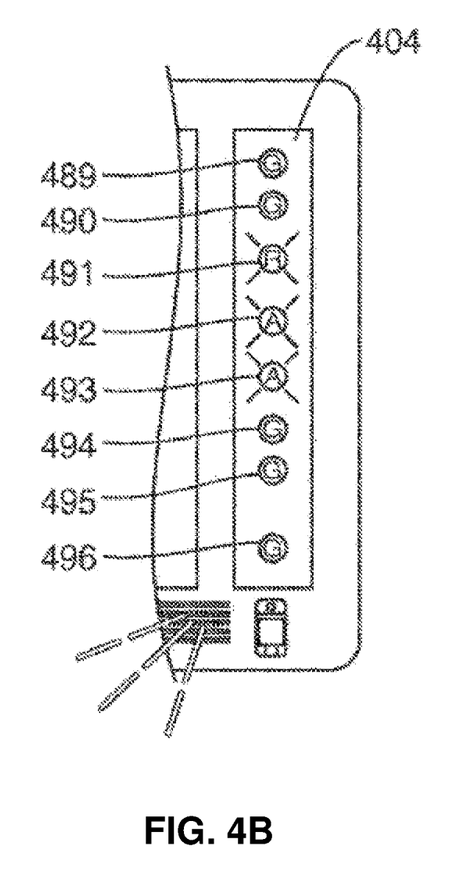
FIG. 4b an alternative system display schematic when the system is in heavy traffic flow according to an embodiment of the invention.

FIG. 4a depicts a display in normal status during heavy traffic conditions wherein each of the indicator lights 409-415 on the display are illumined in a green color (symbolized by the letter G). The console includes a loudspeaker 460 for providing an audio signal. FIG. 4b depicts the console 401 in heavy traffic in the alarm status. In this embodiment, several the indicator lights such as light 491 are in red (symbolized by the letter R) and others, such as light 492 and 493 are illumined in amber (symbolized by the letter A). Other lights represent vehicles may be in green such as light 489, 490, 494, 495 and 496. In this status, the loudspeaker provides an alarm signal.

Figure 4C:
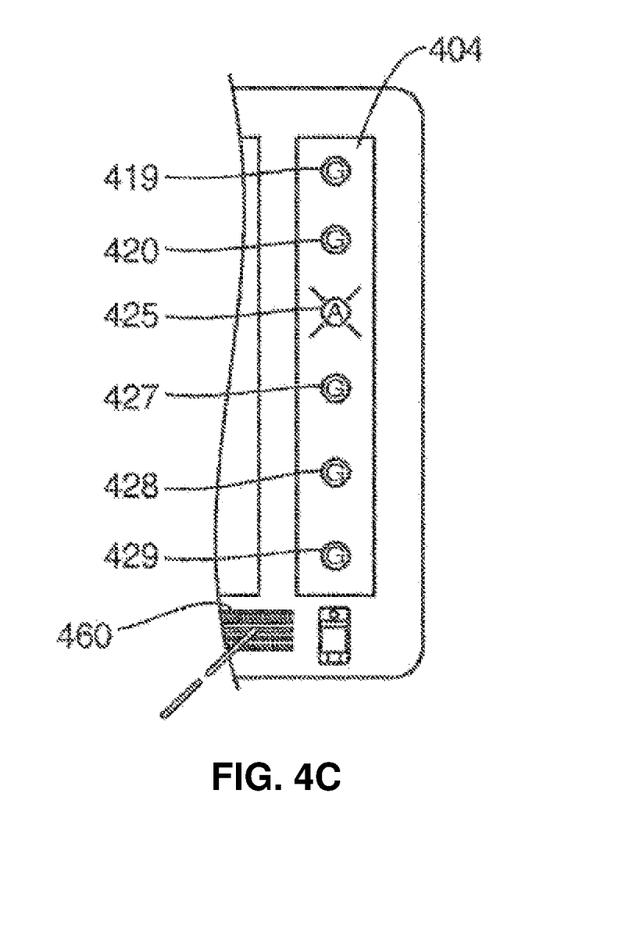
FIG. 4c is system display schematic when the system is in moderate traffic flow according to an embodiment of the invention.

FIG. 4c represents the display system in moderate traffic with the status of the system on Alert status. In this representation light 419, 420 are illuminated in green. Light 425 is illuminated in amber and lights 427, 428 429 and 430 are in green.

Figure 4D:
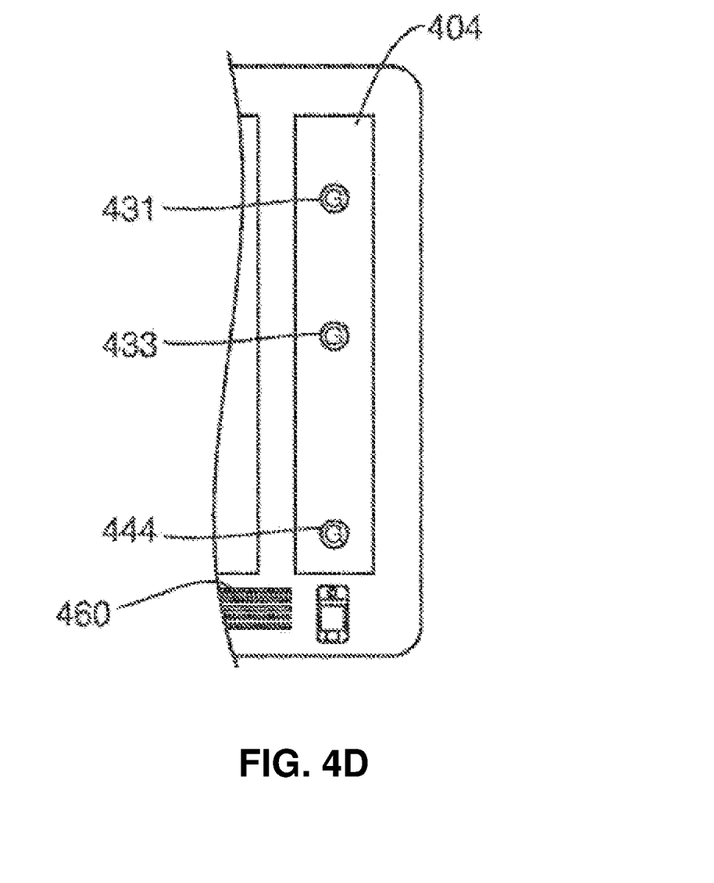
FIG. 4d is system display schematic when the system is in heavy traffic flow according to an embodiment of the invention.

FIG. 4d represents the display in light traffic conditions in normal operating status. Here there are only three cars presented in field 404 and each one of them 431, 433 and 434 are represented in green.

Figure 5:
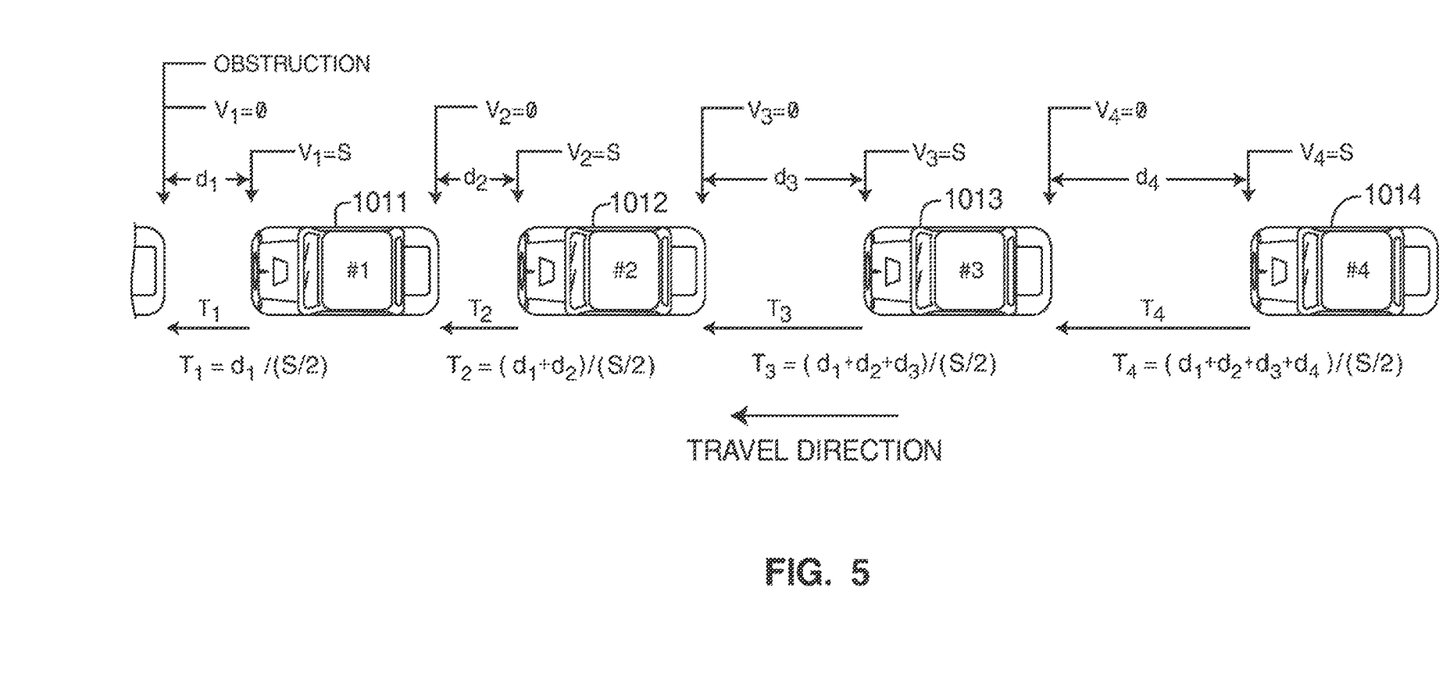
FIG. 5 is a schematic illustration of a vehicle to vehicle transfer concept according to an embodiment of the invention.

FIG. 5 is a schematic illustration of the vehicle to vehicle transfer of information wherein an obstruction encountered and sensed by vehicle 1011 is transmitted to vehicle 1012,

1013 and 1014 regardless of whether each intermediate vehicle reacts to the obstruction. As such, the sequential reaction is bypassed and can be eliminated and further, the intensity of the response can be reduced upstream. Providing the information allows correction time to be more rapid and the reaction, such a braking can be implemented with reduced intensity.

The present invention therefore improves upon conventional brake light and turn-signal binary data with the addition of a signal from a plurality of proximate vehicles that are travelling in the same direction wherein preselected information is captured, and then transmitted to upstream vehicles and processed. While the technology limitations of the brake-light/turn-signal era limited the transmitted information to a simple and short distance binary-signal the present system gathers and processes significant quantities of data, and further allows for rapid and accurate analysis and transmission of the calculated results over substantial distances.

In addition to systems that are directed to traffic flow in generally the same direction, aspects of the invention can also have applications for the detection, alert, and alarms with respect to a 90-degree field of inspection that would monitor a signal from a vehicle (including small sport cars and motorcycles) approaching an intersection so the vehicle at the intersection doesn't pull into their path for a T-bone collision. This embodiment requires that each vehicle-installed system have the capability of monitoring at 90 degrees to the direction of travel and have the capability to transmit a signal forward of the approaching vehicle to alert the vehicle presently at the intersection. The 90-degree system could function as a stand-alone since the calculation of absence or presence of a threat is much simpler than a basic car following system, though much of the hardware technology will be the same.

Basic car-following systems and distance algorithms are well known in the prior art and, for example, the algorithms as disclosed in the following reference are incorporated by reference herein: EVALUATION OF THE GHR CAR FOLLOWING MODEL FOR TRAFFIC SAFETY STUDIES; Kaveh Bevrani, Queensland University of Technology, Australia Edward Chung, Queensland University of Technology, Australia Marc Miska, Queensland University of Technology, Australia; 25th ARRB Conference—Shaping the future: Linking Policy, Research and Outcomes, Perth, Australia 2012 and CAR FOLLOWING MODELS, RICHARD W. ROTHERY, Senior Lecturer, Civil Engineering Department, The University of Texas, ECJ Building 6204, Austin, Tex. Acha-Daza, J. A. and F. L. Hall (1994); Application of Catastrophe Theory to Traffic Flow Variables; Transportation Research—B, 28B(3), Elsevier Science Ltd., pp. 235-250. Babarik, P. (1968). Automobile Accidents and Driver Reaction Pattern, Journal of Applied Psychology, 52(1), pp. 49-54. Barbosa, L. (1961). Studies on Traffic Flow Models. Reports No. 202A-1, The Ohio State University Antenna Laboratory, Bender, J. G. (1971). An Experimental Study of Vehicle Automatic Longitudinal Control. IEEE Transactions on Vehicular Technology, VT-20, pp. 114-123. Bender, J. G. (1991). An Overview of Systems Studies of Automated Highway Systems. IEEE Transactions on Vehicular Technology 40(1). IEEE Vehicular Technology Society, pp. 82-99. Bender, J. G. and R. E. Fenton (1969). A Study of Automatic Car Following. IEEE Transactions on Vehicular Technology, VT-18, pp. 134-140. Cardew, K. H. F. (1970). Traffic Dynamics: Studies in Car Following, Operations Research, 6, pp. 165-184. Chow, T. S. (1958). Operational Analysis of a Traffic Dynamics Problem. Operations Research, 6(6), pp. 165-184. Constantine, T. and A. P. Young (1967). Traffic Dynamics: Car Following Studies. Traffic Engineering and Control 8, pp. 551. Cumming, R. W. (1963). The Analysis of Skills in Driving. Journal of the Australian Road Research Board 1, pp. 4. Darroch, J. N. and R. W. Rothery (1973). Car Following and Spectral Analysis. Proceedings of the 5th International Symposium on the Theory of Traffic Flow and Transportation. Ed. Newell, G. F., American Elsevier Publishing Co., New York. Drake, J. S., J. L. Schofer, and A. D. May, Jr. (1967). A Statistical Analysis of Speed Density Hypotheses. Highway Research Record 154, pp. 53-87. Drew, D. R. (1965). Deterministic Aspects of Freeway Operations and Control. Highway Research Record, 99, pp. 48-58. Edie, L. C. (1961). Car Following and Steady State Theory for Non-Congested Traffic. Operations Research 9(1), pp. 66-76. Edie, L. C. and E. Baverez (1967). Generation and Propagation of Stop-Start Waves, Vehicular Traffic Science Proceedings of the 3rd International Symposium on the Theory of Traffic Flow, L. C. Edie, R. Herman and R. W. Rothery (Eds.), American Elsevier, New York. Gazis, D. C., R. Herman, and R. B. Potts (1959). Car Following Theory of Steady State Traffic Flow, Operations Research 7(4), pp. 499-505. Gazis, D. C., R. Herman, and R. W. Rothery (1961). Car Following Theory of Steady State Traffic Flow, Operations Research 7(4), pp. 499-505. Gazis, D. C., R. Herman, and R. W. Rothery (1963). Analytical Methods in Transportation: Mathematical Car-Following Theory of Traffic Flow, Journal of the Engineering Mechanics Division, ASCE Proc. Paper 3724 89 (Paper 372), pp. 29-46. Herman, R. and R. W. Rothery (1965). Car Following and Steady-State Flow, Proceedings of the 2nd International Symposium on the Theory of Traffic Flow, Ed J. Almond, O. E. C. D., Paris. Herman, R. and R. W. Rothery (1969). Frequency and Amplitude Dependence of Disturbances in a Traffic Stream, Proceedings of 4th International Symposium on the Theory of Traffic Flow, Ed. W. Leutzbach and P. Baron. Bonn, Germany, Herman, R. and R. W. Rothery (1962). Microscopic and Macroscopic Aspects of Single Lane Traffic Flow, Operations Research, Japan, pp. 74, Harris, A. J. (1964). Following Distances, Braking Capacity and the Probability of Danger of Collision Between Vehicles, Australian Road Research Board, Proceedings 2, Part 1, pp. 496-412. All of the following references are incorporated by reference herein.

A system and method for providing an alert warning to a driver is therefore provided that includes a vehicle that has forward facing vehicle sensors, and the forward-facing vehicle sensor is operable to detect the presence and relative distance of a forward obstruction in a travel lane immediately in front of said vehicle. The system also includes a processor for receiving signals from the forward sensor and to processes the signal to determine the speed, and acceleration or deceleration of the forward obstruction.

Embodiments of the system also include a signal receiver to receive signal from forward obstructions and a transmitter, for the transmission of information relating to the vehicle and forward obstructions to following vehicles. The forward obstructions may be stationary objects. The system includes an alert and/or alarm device which is triggered and displayed using an algorithm run by said processor that uses forward sensor data, speed data and vehicle braking characteristics for the vehicle in the event that a collision is imminent unless evasive action is implemented.

In embodiments adapted for autonomous driving, a signal is transmitted from the processor to a vehicle control system which includes both braking and steering operation. The processor may receive data relating to the distance between a forward obstruction and the vehicle as well as relative acceleration or declaration between said vehicles and said forward obstruction is determined. Accordingly, in various embodiments, the speed of a forward obstruction is determined, the acceleration or deceleration of the forward obstruction is determined, and the data is transmitted so that rearward vehicles have the benefit of such information. Data relating to the speed of the obstruction and other vehicles travelling in the same direction of the vehicle are determined and displayed on a vehicle display and such information is also transmitted to rearward vehicles of the index vehicle.

In embodiments, a look-up table that reflects braking characteristics of preselected vehicles and processor uses data relative to the vehicles in an algorithm provided and this information is stored in a memory accessible to the processor. The vehicle display may include light and sounds that reflect the traffic flow of other vehicles forward relative to the vehicle. A display may further represent a plurality of vehicles in a forward traffic lane and each vehicle is graphically represented in said display.

Embodiments of the system include a graphic display that reflects different color indicator lights each of which signify a status of each said forward vehicles. In embodiments, an alert system may provide tactile feedback to the driver such as vibration in the steering wheel that reflects the existence of an alert or alarm condition. The system is particularly helpful when a plurality of vehicles are traveling in a single lane of traffic. However, in other contemplated embodiments, vehicle indication codes and other vehicle identification data such as color, make model year, vehicle type (truck sedan, SUV, etc.) can be transmitted, collected, and used on a display of multiple vehicles in multiple lane highways and other roadways and such display may include information on the relative status of the vehicle relative to the driver vehicle. This data can include information from vehicles, obstructions, bike, and pedestrians traveling transverse to the path of the index vehicle. While the applicant uses the term "rear transmitter" or "forward signal receiver" the transmissions could in some instances be from any direction and what is important is that that the driver vehicle will only collect, process and display data relating to vehicles that are in a forward position relative to the index or driver's vehicle in the embodiments that use driver control.

In a further embodiment, the system is adapted for use in autonomous vehicles. The U.S. Department of Transportation's National Highway Traffic Safety Administration (NHTSA) has defined five different levels of autonomous driving. In October 2016, the NHTSA updated their policy to reflect that it has officially adopted the levels of autonomy outlined in the SAE International's J3016 document. According to these standards, beginning at Level 3, the automated driving system becomes able to monitor the driving environment. In the recognized system, at Level 1 describes circumstances wherein most functions are still controlled by the driver, but a specific function (like steering or accelerating) can be done automatically by the car.

In Level 2, at least one driver assistance system of either steering and acceleration/deceleration is automated and uses information about the driving environment. In this level, the driver is disengaged from physically operating the vehicle by having his or her hands off the steering wheel and his or her foot is off the pedals at the same time. The driver must still always be ready to take control of the vehicle. In Level 3 drivers are still necessary but can completely shift "safety-critical functions" to the vehicle, under certain traffic or environmental conditions. It means that the driver is still present and will intervene if necessary, but the driver is not required to monitor the situation in the same way it does for the previous levels. Level 3 is complicated to implement because it involves transferring control from car to human in certain conditions for instant intervention. Level 4 is the first stage that can be described as fully autonomous. Level 4 vehicles are designed to perform all safety-critical driving functions and monitor roadway conditions for an entire trip. However, it is also limited to the operational design domain of the vehicle—meaning it does not cover every driving scenario. Level 5 refers to a fully-autonomous system that expects the vehicle's performance to equal that of a human driver, in every driving scenario. This would include extreme environments such as dirt roads or snow-covered roads that are less likely to be navigated by driverless vehicles in the near future. In these embodiments, in addition to or in lieu of an alert and/or alarm signals communicated to a driver, a signal is transmitted to an automatic vehicle control system that is engineered to steer, accelerate and decelerate the vehicle in response to input relating to the car's position and road environment. The present system can therefore advantageously supplement existing autonomous vehicle driving systems.

In a further embodiment of the present system, a plurality of cars or trucks could join in a platoon and use the system to operate over long distances. The system would therefore function much like an improved version of adaptive cruise control, matching a car's movements to the distance, speed, and the direction of the cars in front. Once in a platoon, the drivers may relax and do other things like reading or even taking a nap while the platoon drives toward its long-distance destination.

In a further embodiment, the system uses signals from cell phones to assist with object detection and collision avoidance. This feature is particularly helpful in providing further data with respect to pedestrians, runners and bike riders that have smaller physical signatures available for detection by optical or radar systems. When a smartphone device is on a call it is either transmitting data or receiving data from the cell tower and at least one of the antennas in the smartphone is on and sending/receiving signals that can be detected. When a device is powered on but in standby mode and not in use, the device will briefly and periodically communicate with local towers. Depending on the cellular technology used the intervals between can range from a few seconds up to 30 minutes. When a handheld cell phone device is in active mode, it constantly sends and receives RF signals from cell towers receivers and transmitters. Examples of active mode include being on a call, streaming video or music and downloading applications. While phones that are standby mode are more difficult to zero in on due to the longer inactivity intervals, cell phone detection technology can determine when a phone is in the area. Smartphones are essentially devices that includes both a cell phone function and a PDA including internet and Bluetooth communication features, and, when equipped with a data plan, they can connect to the Internet and perform most of the functions of a computer over a cell phone network. Smartphones can be easier to detect when loaded with apps that synchronize automatically such as email, weather data, and messaging. Because many bike riders, pedestrians and runners use applications to track their progress, not only does the collection of the information create signals that may be detected and used by the system, including both manual and autonomous modes, but data from the applications themselves may be shared by the users of the applications and vehicles using the systems of the invention described herein. Such applications include Map-my-Run, Map-my-Ride, Strava and other active Cellphone tracking technologies.

The cell phone detection technology works by detection signature radio frequencies that emit from a vehicle when someone inside is using a cellphone. A text message, phone call and data transfer emit different frequencies that can be distinguished by a RF receiver. A cell phone typically transmits and receives signals in the frequency range of 0.9 to 3 GHz and a circuit can be configured to detect the presence of an activated cell phone by detecting these signals.

Radiolocation, also referred to as radio-determination, as used herein, encompasses any process of finding the location of a transmitter by means of the propagation properties of waves. The angle, at which a signal is received, as well as the time it takes to propagate, may both contribute to the determination of the location of the transmission device. There are a variety of methods that may be employed in the determination of the location of a transmission device. Methods include (i) a cell-sector system that collects information pertaining to cell and sector ID's, (ii) the assisted-global positioning satellite (GPS) technology utilizing a GPS chipset in a mobile communication device, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (iix) location based on proximity to known locations (including locations of other radio-transmitters), (ix) map-based location, or any combination of any of the foregoing, as well as other location devices known to those of skill in the art.

By employing a plurality of antennas, positioned to maintain line-of-sight between possible transmission device locations and the receiving antennas, several of these methods may be effectively used in the location of the transmission device. These methods include time difference of arrival, time of arrival, and angle of arrival, amplitude comparison, and the like. The time difference of arrival method determines the difference in the time, or the difference in phase, of the same radio-transmitting signal arriving at different receiving antennas. Together with the known propagation speed of the radio wave, allows the determination of the location of the transmission device. The time of arrival method determines the absolute time of reception of the signal at different receiving antennas, and again, along with the known propagation speed of the radio wave, allows the determination of the location of a transmission device. The angle of arrival method utilizes direction of transmission to different antennas to determine the location of the transmission device. Amplitude comparison method compares the strength of the signal detected at each antenna to determine the location of a transmission device. For example, two antennas located on a vehicle would detect different signal amplitudes for the same transmission device output, thereby providing a means of determining which antenna the transmission device is closer to. Increasing the number of antennas can therefore increase the resolution with which the location of the transmission device may be determined. All of these methods, and combinations of these methods, may employ mathematical processes such as triangulation, trilateration, multi-lateration, or like, in determining the location of the transmission device.

Triangulation is the process of finding coordinates and distance to a point by calculating the length of one side of a triangle, given measurements of angles and/or sides of the triangle formed by that point, such as the transmission device, and two other known reference points, such as the receiving antennas on the vehicle. The calculation of the location of a transmission may then be performed utilizing the law of Sines from trigonometry. Tri-lateration is a method similar to triangulation, but unlike triangulation, which uses angle measurements, together with at least one known distance, to calculate the subject's location, tri-lateration uses the known locations of two or more reference points and the measured distance to the subject, such as the transmission, and each reference point, such as the receiving antennas. Multi-lateration, or hyperbolic positioning, is like tri-lateration, but multi-lateration uses measurements of time difference of arrival, rather than time of arrival, to estimate location using the intersection of hyperboloids.

There are currently commercial available devices that can detect RF frequencies that originate from cell phones including Berkley Varitronics Systems, Inc., Comsonics, Inc and Libelium Communicaciones Distribuidas S. L. For example, the Wolfhound™-PRO's high-speed scanning receiver available from Berkeley Varitronics Systems, Inc. is a multi-band DF (Direction Finding) antenna system allowing the identification of nearby cell phones in either standby mode or during active voice, text, or data RF transmissions. For pursuing and locating a cell phone being used, a directional antenna is used and oriented in a forward direction. A laser-assisted Direction Finding (DF) antenna used with such detectors to further guide the system to the potential sources with minimal ambiguity because there are no significant reflecting surfaces to create interference patterns. The detected signal level will be determined mainly by the distance from the source and the transmit power level of the target hand set. Commercial available devices reportedly can detect cell phones up to one mile away in line-of-sight conditions.

The present invention has been illustrated and described with respect to specific embodiments thereof, which embodiments are merely illustrative of the principles of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with the claims that follow.

The invention claimed is:

1. A system for providing input to a control system of an operating vehicle, said system comprising a forward-facing signal sensor, said forward facing signal sensor operable to detect transmitted data signals reflecting a presence, relative distance and relative location of a first forward obstruction in or near a travel lane in front of said operating vehicle;

an on-board vehicle status sensor configured to generate a status signal, wherein said status signal comprises a speed of said operating vehicle;

a processor configured to receive data from said forward-facing signal sensor and said status sensor and said processor adapted to process said transmitted data and a status operating information signal to determine a separate distance, a speed, and an acceleration or a deceleration of said forward obstruction with respect to said operating vehicle;

said forward-facing signal sensor further adapted to receive a relay signal from said forward obstruction, said relay signal originating from a source remote from said forward obstruction and relating to a second forward obstruction; and a rear-signal transmitter, said rear-signal transmitter adapted to transmit information to a following vehicle, said information comprising said status signal and information from said forward-facing signal sensor indicating said presence and relative distance of said first forward obstruction and second forward obstruction; and a vehicle control signal, wherein said vehicle control signal is generated in response to a collision avoidance algorithm run by said processor that uses data from a forward-facing signal detector, said status operating information and said relay signal in an event that said algorithm determines that a collision is imminent.

2. The control system of claim 1 wherein said operating vehicle is autonomously controlled.

3. The control system of claim 2 wherein said first forward obstruction comprises a forward vehicle and said forward-facing signal sensor is adapted to detect data relating to a distance between said forward vehicle and said operating vehicle and a relative acceleration or deceleration between said operating vehicle and said forward obstruction is determined by said processor.

4. The control system of claim 3 further comprising a communication handshake procedure wherein a signal sent by said forward vehicle is received and acknowledged by said operating vehicle and said acknowledgement is transmitted to said forward vehicle.

5. The control system of claim 1 further comprising a forward-facing signal detector adapted to detect the presence and location of a cell phone signal transmitting device.

6. The control system recited in claim 1 wherein said system further receives signals from a cell phone tracking program, said cell phone tracking program providing data relating to a location, speed and direction of a nearby cellphone device, and data from said cell phone tracking program is incorporated in said collision avoidance algorithm.

7. The control system of claim 1 wherein said system further provides alert signals to occupants of said operating vehicle.

8. The control system of claim 1 wherein said system provides alert signals to third parties.

9. The control system of claim 7 wherein said alert signals comprise audio signals.

10. The control system of claim 8 wherein said alert signals are transmitted over a wireless network to a remote location.

11. The control system of claim 2 wherein the system is used in a platoon of a plurality of vehicles and each said vehicle in said platoon is recognized by every other vehicle in said platoon using a handshake communication.

12. The control system of claim 2 wherein said autonomously controlled operating vehicle is a level 4.

13. The control system of claim 3 wherein a speed of said first forward obstruction and said operating vehicle is determined and transmitted from said operating vehicle from said rear signal transmitter.

* * * * *